Nov. 24, 1936.  L. R. SAFERITE  2,061,851
TIRE BOOT
Filed Sept. 18, 1935
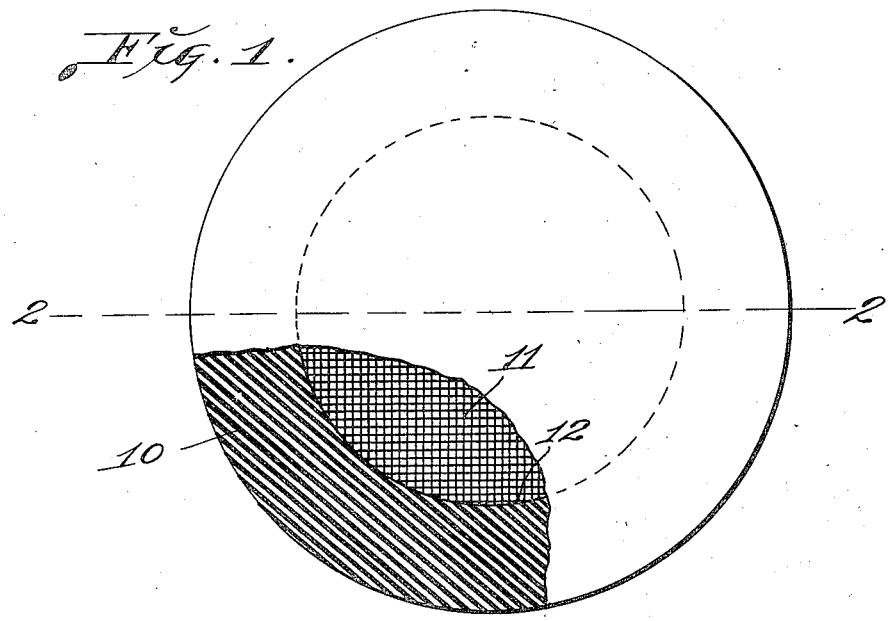
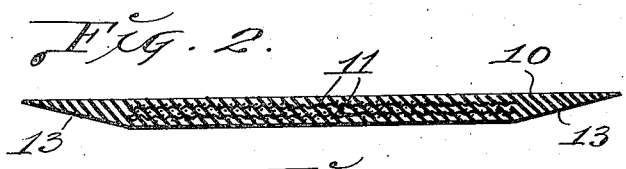
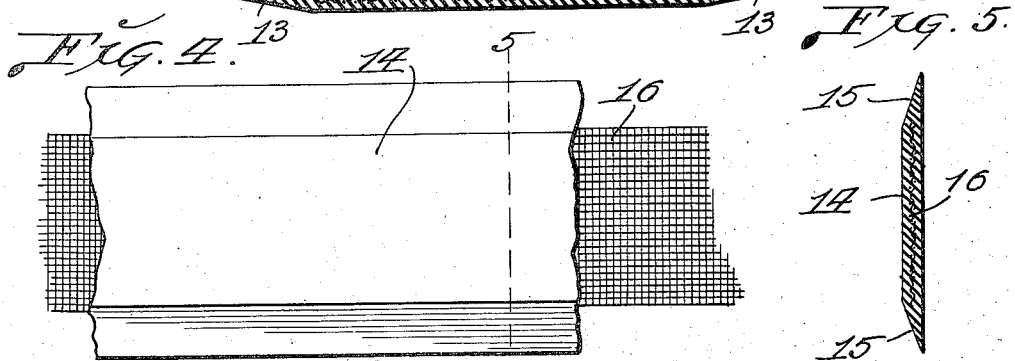
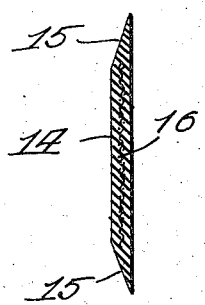
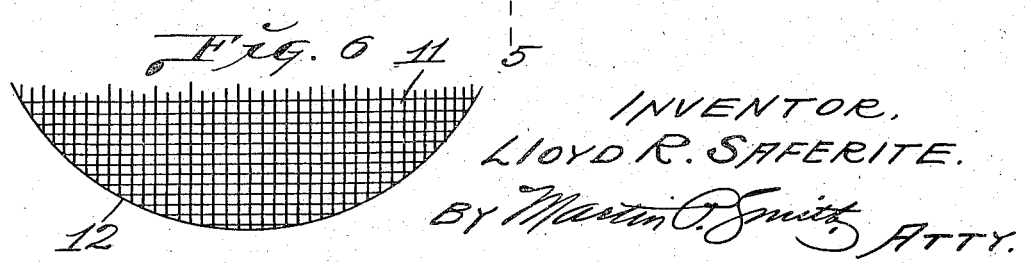
INVENTOR,
LLOYD R. SAFERITE.
BY Martin C. Smith, ATTY.

Patented Nov. 24, 1936

2,061,851

UNITED STATES PATENT OFFICE 2,061,851

TIRE BOOT

Lloyd R. Saferite, Los Angeles, Calif., assignor of one-half to Edward G. Leap, Merced, Calif.

Application November 18, 1935, Serial No. 50,283

2 Claims. (Cl. 152—26)

My invention relates generally to tire boots or blow-out patches that are utilized as protective elements between the casings and tubes of pneumatic tires and the principal objects of my invention are, to generally improve upon and simplify the construction of the existing forms of tire boots, blow-out patches, reliners and the like and to provide a device of the character referred to that is formed in a single piece from rubber or composition having rubber as its principal ingredient and there being imbedded in the rubber body one or more reenforcing elements, preferably of ductile wire screen or netting and which latter is highly effective in reenforcing the boot or liner when the same is applied for use.

A further object of my invention is to provide a device of the character referred to which when properly produced, presents a practically integral or one piece construction inasmuch as it comprises a single piece of rubber or rubber composition molded or pressed to proper shape and have imbedded therein one or more ductile reenforcing elements preferably formed of wire netting and the ends of the wires that compose the netting being connected to a marginal ductile member, preferably wire, so as to prevent the ends of the wire from puncturing or cutting into the body of rubber in which they are imbedded as the boot or lining member flexes under movement imparted by the tire casing and tube while in service.

With the foregoing and other objects in view my invention consists in certain novel features of construction and arrangements of parts that will be hereinafter more fully described and claimed and illustrated in the accompanying drawing in which:

Fig. 1 is a plan view of a tire boot or reenforcing member constructed in accordance with my invention, with a portion of the body broken away in order to show the reenforcing element of ductile wire screen or netting.

Fig. 2 is a cross section taken on the line 2—2 of Fig. 1.

Fig. 3 is a cross section similar to Fig. 2 and showing a single ductile reenforcing element imbedded in the rubber body of the device.

Fig. 4 is a plan view of a portion of a reliner or tire flap constructed in accordance with my invention.

Fig. 5 is a cross section taken on the line 5—5 of Fig. 4.

Fig. 6 is a fragmentary view of a portion of the ductile reenforcing element that is imbedded in the shoe or reliner and showing the marginal protecting wire that is connected to the ends of the crossed wires.

In the construction of tire boots, inside patches and the like, as illustrated in Figs. 1, 2 and 3, a body 10 of any desired size and shape is molded in a single piece from rubber or composition of which rubber is the principal ingredient and imbedded in said body, is a reenforcing member or members 11, each composed of ductile wire screen or netting. I prefer to use small gauge copper wire in the formation of these reenforcing members inasmuch as copper is ductile to a high degree and it will readily flex and bend in any direction to correspond to the flexing or changes in shape of the body 10.

This reenforcing member corresponds in shape with the shape of the body 10, but the size of said reenforcing member is somewhat smaller than the size of the body 10 and in the construction of this device the reenforcing member is disposed within the body so that the edges of the two members are approximately concentric or parallel with each other.

The reenforcing member or members 11 are imbedded in the body 10 and lying parallel with the flat faces thereof and the rubber or rubber composition of which the body 10 is formed passes thorugh the interstices between the wires forming the reenforcing member, thereby very firmly anchoring the latter within the body.

Where two or more reenforcing members are imbedded in one body, said reenforcing members are spaced apart a suitable distance, as illustrated in Fig. 2.

In order to prevent the ends of the individual wires forming the reenforcing member from cutting into the rubber or rubber composition forming the body 10, I prefer to connect the edges of all of the wires with one or more marginal wires 12 and these protective wires may be secured to the ends of the crossed wires in any suitable manner.

One or both of the flat faces of the body 10 may be bevelled as designated by 13, in order that the boot or patch will fit snugly between a tire casing and inner tube.

In the production of reliners, tire flaps and the like, an elongated band or strip 14 is formed in a single piece from rubber or rubber composition, one face of said strip being beveled along its edges as indicated by 15 and imbedded in said strip, is a slightly narrower reenforcing element 16 composed of ductile wire screen or netting.

Inasmuch as my improved tire boot or protective member is formed in a single piece from rubber or composition, it will readily adjust itself and conform to the shape of the tire casing and tube and the reenforcing element being formed of ductile wire will likewise readily bend and conform to the shape that is assumed by the body 10 and no internal strains will be developed between the body and its reenforcing element and which strains would otherwise tend to cause the reenforcing element to separate from the body in which it is imbedded.

Thus it will be seen that I have provided a tire boot, reliner or the like that is relatively simple in construction, inexpensive of manufacture and very effective in performing the functions for which it is intended.

It will be understood that minor changes in the size, form and construction of the various parts of my improved tire boot may be made and substituted for those herein shown and described without departing from the spirit of my invention, the scope of which is set forth in the appended claims.

I claim as my invention:

1. As a new article of manufacture, a tire boot or the like, comprising a substantially flat body formed of a single sheet of resilient plastic material, reinforcing means embedded in said body centrally of the same, said means comprising at least one sheet of ductile wire screen material, and a ductile wire extending entirely around said screen and being secured thereto by the ends of all of the wires forming said screen to form a smooth edge for the latter and to prevent the ends of said wires from cutting or tearing said body.

2. As a new article of manufacture, a tire boot or the like, comprising a substantially flat body comprising a single sheet of rubber, said body having flat, and substantially smooth upper and lower surfaces, reinforcing means embedded in said body centrally of the same, said means comprising at least one sheet of ductile wire screen material, and a ductile wire extending entirely around said screen and being secured thereto by the ends of all of the wires forming said screen whereby to form a smooth edge for said screen and to prevent the ends of said wires from cutting or tearing said body.

LLOYD R. SAFERITE.